United States Patent
Fantazi et al.

(10) Patent No.: US 8,789,664 B2
(45) Date of Patent: Jul. 29, 2014

(54) COMBINED SERVICE BRAKE AND SPRING BRAKE CYLINDER WITH SEALING ASSEMBLIES CONSISTING OF A GUIDE RING AND AT LEAST ONE SEALING ELEMENT

(75) Inventors: Alain Fantazi, Dives sur mer (FR);
Jacques Lanquetot, Trouville/Mer (FR);
Franck Hemery, Honfleur (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 245 days.

(21) Appl. No.: 13/049,404

(22) Filed: Mar. 16, 2011

(65) Prior Publication Data

US 2011/0209953 A1    Sep. 1, 2011

Related U.S. Application Data

(63) Continuation of application No. PCT/EP2009/006526, filed on Sep. 9, 2009.

(30) Foreign Application Priority Data

Sep. 17, 2008 (DE) .......................... 10 2008 047 633

(51) Int. Cl.
*F16D 65/14* (2006.01)

(52) U.S. Cl.
USPC ...................................... 188/106 F; 188/170

(58) Field of Classification Search
CPC .................................................. B60T 17/083
USPC ....... 188/322.16, 322.17, 322.18, 106 F, 356, 188/153 D, 166, 170; 303/113.3, 114.3, 303/115.1; 92/63, 27
See application file for complete search history.

(56) References Cited

U.S. PATENT DOCUMENTS 3,977,308 A * 8/1976 Swander et al. ................... 92/63
4,480,530 A * 11/1984 Holmes .............................. 92/78

(Continued)

FOREIGN PATENT DOCUMENTS

CN   101099050 A    1/2008
DE   34 43 725 A1   6/1986

(Continued)

OTHER PUBLICATIONS

International Search Report dated Feb. 18, 2010 with English translation (six (6) pages).

(Continued)

*Primary Examiner* — Xuan Lan Nguyen
(74) *Attorney, Agent, or Firm* — Crowell & Moring LLP

(57) ABSTRACT

A combined service brake and spring brake cylinder for vehicle brake systems, includes a service brake piston and a spring brake piston. A sealing assembly is located in a central bore of a partition and seals off the interior of the service brake cylinder from the interior of the spring brake cylinder. The radial outer peripheral surface of the spring brake piston has an additional sealing assembly for sealing off a spring chamber. At least one of the sealing assemblies contains a guide ring that guides the spring brake piston rod in the bore of the partition, or the spring brake piston in the spring brake cylinder. The guide ring consists of a more rigid material than that of at least one sealing element. The sealing element consists of an elastomer that is connected to the guide ring by original forming methods such as injection molding or transfer molding.

9 Claims, 3 Drawing Sheets

(56) References Cited

U.S. PATENT DOCUMENTS

| | | | |
|---|---|---|---|
| 5,623,862 A * | 4/1997 | Hanaway et al. | 92/63 |
| 5,697,474 A | 12/1997 | Antony et al. | |
| 6,003,848 A * | 12/1999 | Cotter et al. | 267/64.11 |
| 6,024,421 A * | 2/2000 | Sinnl | 303/115.1 |
| 6,394,462 B1 | 5/2002 | Constantinides et al. | |
| 2006/0131116 A1 | 6/2006 | Plantan et al. | |
| 2008/0106144 A1 | 5/2008 | Schrader | |
| 2011/0209953 A1 | 9/2011 | Fantazi et al. | |
| 2012/0211312 A1 | 8/2012 | Engels | |

FOREIGN PATENT DOCUMENTS

| | | |
|---|---|---|
| DE | 40 11 739 A1 | 10/1991 |
| DE | 198 13 240 C1 | 8/1999 |
| EP | 0 486 824 A1 | 5/1992 |
| EP | 0 692 651 A1 | 1/1996 |
| EP | 0 740 085 A1 | 10/1996 |
| EP | 0 740 085 B1 | 9/2000 |
| EP | 2 337 720 B1 | 6/2012 |
| EP | 2 493 738 B1 | 3/2014 |
| GB | 2 169 671 A | 7/1986 |
| WO | WO 94/21501 A1 | 9/1994 |
| WO | WO 03/080417 A2 | 10/2003 |
| WO | WO 03/080418 A1 | 10/2003 |

OTHER PUBLICATIONS

German Office Action dated Feb. 17, 2014 (six (6) pages).

* cited by examiner

COMBINED SERVICE BRAKE AND SPRING BRAKE CYLINDER WITH SEALING ASSEMBLIES CONSISTING OF A GUIDE RING AND AT LEAST ONE SEALING ELEMENT

CROSS-REFERENCE TO RELATED APPLICATIONS

This application is a continuation of PCT International Application No. PCT/EP2009/006526, filed Sep. 9, 2009, which claims priority under 35 U.S.C. §119 from German Patent Application No. DE 10 2008 047 633.1, filed Sep. 17, 2008, the entire disclosures of which are herein expressly incorporated by reference.

BACKGROUND AND SUMMARY OF THE INVENTION

The invention relates to a combined service brake and spring brake cylinder for vehicle brake systems, having a service brake piston, which is arranged in the housing of the service brake cylinder, and a spring brake piston, which is arranged in the housing of the spring brake cylinder, can be actuated by at least one accumulator spring and has a spring brake piston rod that projects through a central bore of a partition between the service brake cylinder and the spring brake cylinder in such a way that it acts on the service brake piston. A first sealing assembly is located in the central bore of the partition and seals off the interior of the service brake cylinder from the interior of the spring brake cylinder. The radial outer circumferential surface of the spring brake piston carries an additional sealing assembly for sealing off a spring chamber that houses the accumulator spring from a spring brake chamber of the spring brake cylinder, to which air can be admitted and from which air can be released.

A combined service brake and spring brake cylinder of the above-described type is known from DE 40 11 739 A1, for example. In DE 40 11 739 A1, the spring brake piston rod is sealed off by way of a sealing ring (not described in detail) inserted into the central bore of the partition. Furthermore, the spring brake piston is also sealed off relative to a radially inner wall of the spring brake cylinder by way of a sealing ring arranged on the outer circumference of the piston.

In such combined service brake and spring brake cylinders, the spring brake piston actuates the service brake piston with its spring brake piston rod when the parking brake is applied. The piston, for its part, has a service brake piston rod which interacts with a braking mechanism of the vehicle brake, in particular a disc brake. A brake mechanism of this kind is described in EP 0 740 085 B1, for example, and has a pivoted lever, which is pivotally connected to the service brake piston rod and is connected securely in terms of rotation to an application shaft provided with a cam contour that leads to an axial relative motion of a brake caliper and of a brake pad of a disc brake when the application shaft is turned about the longitudinal axis thereof.

Since the pivoted lever pivotally connected to the service brake piston rod turns about the application shaft during this movement, a tilting moment about an axis perpendicular to the longitudinal axis is exerted on the service brake piston rod and hence on the service brake piston. Because the relatively large end face of the spring brake piston rod is supported flat against the service brake piston when the parking brake is applied, this tilting moment is therefore also transmitted at least in part to the spring brake piston rod and to the spring brake piston. Since the spring brake piston rod is guided in the central bore of the partition by one sealing assembly, and the spring brake piston is guided relative to the spring brake cylinder by the other sealing assembly, this tilting moment acts at least in part also on the sealing assemblies, and this can lead to damage to the sealing assemblies in the long term and hence to a diminution of the sealing effect.

Given this situation, it is an object of the present invention to provide a combined service brake and spring brake cylinder of the above-mentioned type such that the sealing assemblies have a longer life.

According to the invention, at least one of the sealing assemblies contains a guide ring that guides the spring brake piston rod in the bore of the partition, or the spring brake piston in the spring brake cylinder. The ring is composed of a more rigid material than that of at least one sealing element. The sealing element is composed of an elastomer that is connected to the guide ring by a primary forming method such as injection molding or transfer molding.

The material selected for the guide ring can then be sufficiently rigid to ensure that the ring can accept the tilting moment acting on the spring brake piston rod and on the spring brake piston for a prolonged period without damage and can divert it into the partition and into the spring brake cylinder, while the material selected for the at least one sealing element can be sufficiently flexible to ensure that it has favorable sealing properties and, in particular, has to perform essentially no guiding function. The selected tolerances between the guide ring and the radially inner wall of the central bore of the partition and/or the radially inner wall of the spring brake piston can then be relatively large since the guide ring has to fulfill essentially no sealing function. This has a favorable effect on manufacturing costs.

In addition, the durability of the sealing assembly also increases because the at least one sealing element performing the sealing function can be made sufficiently flexible to ensure that the tilting moment no longer has a negative effect on the life of the sealing assembly.

Another favorable aspect for the life of the sealing assembly is that the sealing element forms an integral body with the guide ring, where the joining forces have been produced by primary forming, i.e. by direct shaping from a molding compound or a liquid starting material, by inserting the guide ring as a finished component into a die, into which the elastomer material is then introduced under the action of pressure and heat (vulcanization), for example. This is because a connection of this kind produced by primary forming is generally very durable.

In particular, the guide ring is composed of a plastic, such as acetal. As a particularly preferred option, the guide ring has at least one recess with an undercut cross-section, through which the at least one sealing element projects in such a way as to engage behind. The undercut cross-section provides a positive connection in addition to the material connection between the guide ring and the sealing element that derives from the primary forming method, making it even stronger and more durable.

According to a further aspect, provision can be made for the at least one sealing portion of the sealing element to have a dovetail cross-section with two arms at the end remote from the guide ring, one arm forming a seal against the radially inner wall of the central bore of the partition or against the spring brake cylinder, and the other arm forming a seal against the spring brake piston rod or against the spring brake piston. This provides a very flexible seal that can be adapted easily to the surface of the sliding partner.

If the at least one sealing element is of symmetrical design with respect to the guide ring and has two sealing portions each projecting axially beyond the guide ring, there are two sealing surfaces arranged one behind the other or in series in the direction of motion, and this advantageously enhances the sealing effect.

Such a sealing geometry can be produced in a simple manner in the context of the primary forming process. For example, the guide ring may have a plurality of axial through apertures, in particular apertures distributed around the circumference, through which the elastomer material then passes from both sides during the primary forming process. This simultaneously results in a positive connection between the guide ring and the sealing element if the two sealing portions projecting axially from the guide ring have larger outside dimensions than the inside dimensions of the apertures, thereby resulting in the formation of undercut cross-sections.

As a particularly preferred embodiment, the guide ring is designed to have a flexibility in the radial direction such that at least one radially protruding projection on the guide ring can be latched with a recess in the radially inner wall of the central bore of the partition. This enables the guide ring carrying the sealing element to be installed easily in the bore.

Not the least significant feature is that at least one cavity can be formed between the guide ring and the at least one sealing element in order to hold lubricant.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
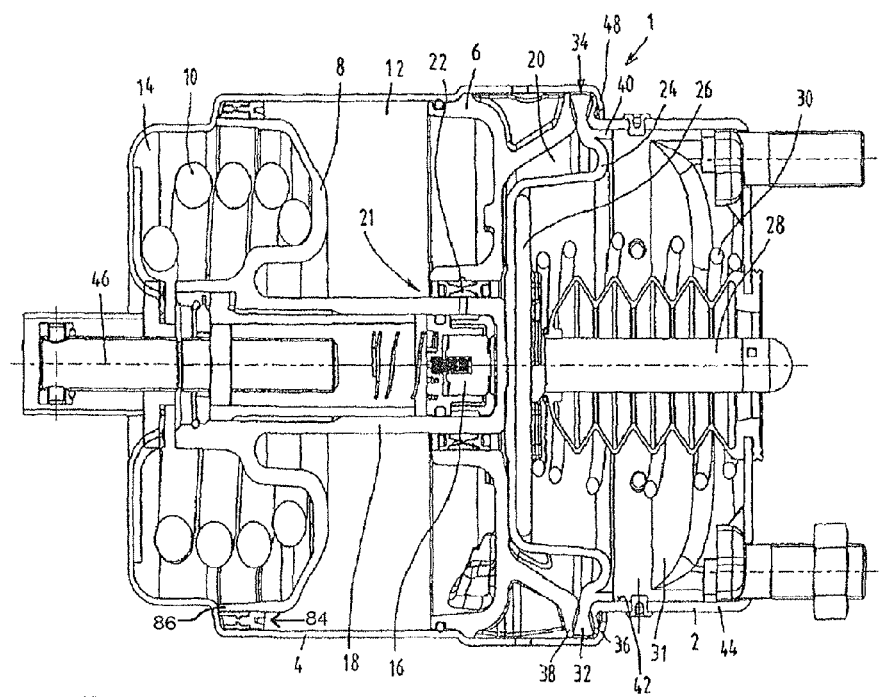
FIG. 1 is a cross-sectional view through a combined service brake and spring brake cylinder with sealing assemblies in accordance with a preferred embodiment of the invention.

FIG. 1 shows a combined service brake and spring brake cylinder 1, referred to below as a combination cylinder. The combination cylinder 1 consists of a service brake cylinder 2 and of a spring brake cylinder 4, which is connected structurally and functionally to the latter. The service brake cylinder 2 and the spring brake cylinder 4 are separated from one another by a partition 6. Arranged movably within the spring brake cylinder 4 is a spring brake piston 8, and an accumulator spring 10 rests against one side of the spring brake piston 8. At its opposite end, the accumulator spring 10 is supported against the end of the spring brake cylinder 4. A spring brake chamber 12 is formed between the spring brake piston 8 and the partition 6 and is connected to a pressure regulating module (not shown for reasons of scale) to enable air to be admitted to and released from the chamber 12. When air is admitted, the spring brake piston 8 is pushed axially into the released position of the parking brake, imposing a load on the accumulator spring 10 in the process. During this movement of the spring brake piston 8, the air within the spring chamber 14 housing the accumulator spring 10 is forced out via a vent valve 16. If, on the other hand, the spring brake chamber 12 is bled for the purpose of braking, the accumulator spring 10 is able to move the spring brake piston 8 into the applied position.

The spring brake piston 8 is connected to a hollow spring brake piston rod 18 that extends through the partition 6 into a service brake chamber 20 of the service brake cylinder 2. A sealing assembly 22 inserted into a central bore 21 of the partition 6 forms a seal with respect to the outer wall of the spring brake piston rod 18 during the longitudinal movement of the latter. Opening into the service brake chamber 20 there is an inlet (not shown), via which compressed air is admitted and discharged to actuate the service brake cylinder 2. The compressed air acts on a diaphragm 24 inserted within the service brake cylinder 2, on the opposite side of which diaphragm a pressure piece in the form of a rigid diaphragm plate 26 is provided. To be more precise, the diaphragm 24 separates the service brake chamber 20 of the service brake cylinder 2, to which chamber pressure medium can be admitted and from which it can be relieved, from a spring chamber 31 that houses a return spring 30 supported against the diaphragm plate 26.

The diaphragm plate 26 is connected to a pushrod 28 that interacts with a brake application device outside the combination cylinder 1. This brake application device can consist of actuating elements of a vehicle disc brake, for example. The service brake cylinder 2 is an active brake cylinder, i.e. the service brake is applied by admitting air to the service brake chamber 20 and released by releasing the air. The return spring 30, which is supported at one end against the diaphragm plate 26 and, at the other end, against the end of the service brake cylinder 2, ensures that the pushrod 28 is returned to the released position when the service brake chamber 20 is vented.

A radially outer fastening edge 32 of the diaphragm 24 has a wedge-shaped cross-section that tapers radially inward. This radially outer fastening edge 32 of the diaphragm 24 with the wedge-shaped cross-section that tapers radially inward is clamped into a holder 34 having a complementary shape with a wedge-shaped cross-section that widens radially outward between the partition 6 and the service brake cylinder 2.

The outer edges of the partition 6 and the service brake cylinder 2 are designed as flanges 36, 38, which are bent radially outward and the mutually facing inner surfaces of which form between them the holder 34 with the wedge-shaped cross-section.

Also formed on the diaphragm 24 is at least one axially extending centering ring 40, which is arranged offset radially inward relative to the fastening edge 32 and by which it can be centered against a radially inner circumferential surface 42 of a wall 44 of the service brake cylinder 2. As a particularly preferred embodiment, the centering ring 40 is arranged substantially perpendicular to a center plane of the fastening edge 32 and, for example, projects away from the diaphragm 24 on one side. Another contemplated embodiment, however, is for the single centering ring 40 to be replaced or supplemented by a centering ring that projects in the direction of the spring brake cylinder 4 and effects centering against the radially inner circumferential surface of the wall thereof.

Another feature is that the radially inner circumferential surface 42 of the service brake cylinder 2, against which the centering ring 40 effects centering, preferably lies on an imaginary cylinder, the center line of which is coaxial with the cylinder axis 46. As shown, the centering ring 40 can be formed so as to run all the way around or to consist of annular segments when viewed in the circumferential direction. The diaphragm 24 is preferably manufactured from rubber, and the centering ring 40 is preferably of integral construction therewith.

A clamping force with an axial component between the partition 6 and the service brake cylinder 2, which are clamped against one another, then ensures that the centering ring 40 of the diaphragm 24 is pressed against the radially inner circumferential surface 42 of the wall 44 of the service brake cylinder 2. In other words, the axial component of the clamping force ensures that the fastening edge 32 is pulled radially outward owing to the wedge effect and, as a result, the centering ring 40 is pressed with a higher radial force against the radially inner circumferential surface 42 of the wall 44 of the service brake cylinder 2, with a self-reinforcing effect on the centering.

Such an axial clamping force component can be achieved, for example, if the edge of the service brake cylinder 2, which forms a flange 36, and the flange 38 of the partition 6, are gripped by an edge 48 of the wall of the spring brake cylinder 4 in the manner of clinching, this being produced by a forming process, for example. This clinching then provides the axial component of the clamping force.

Figure 2:
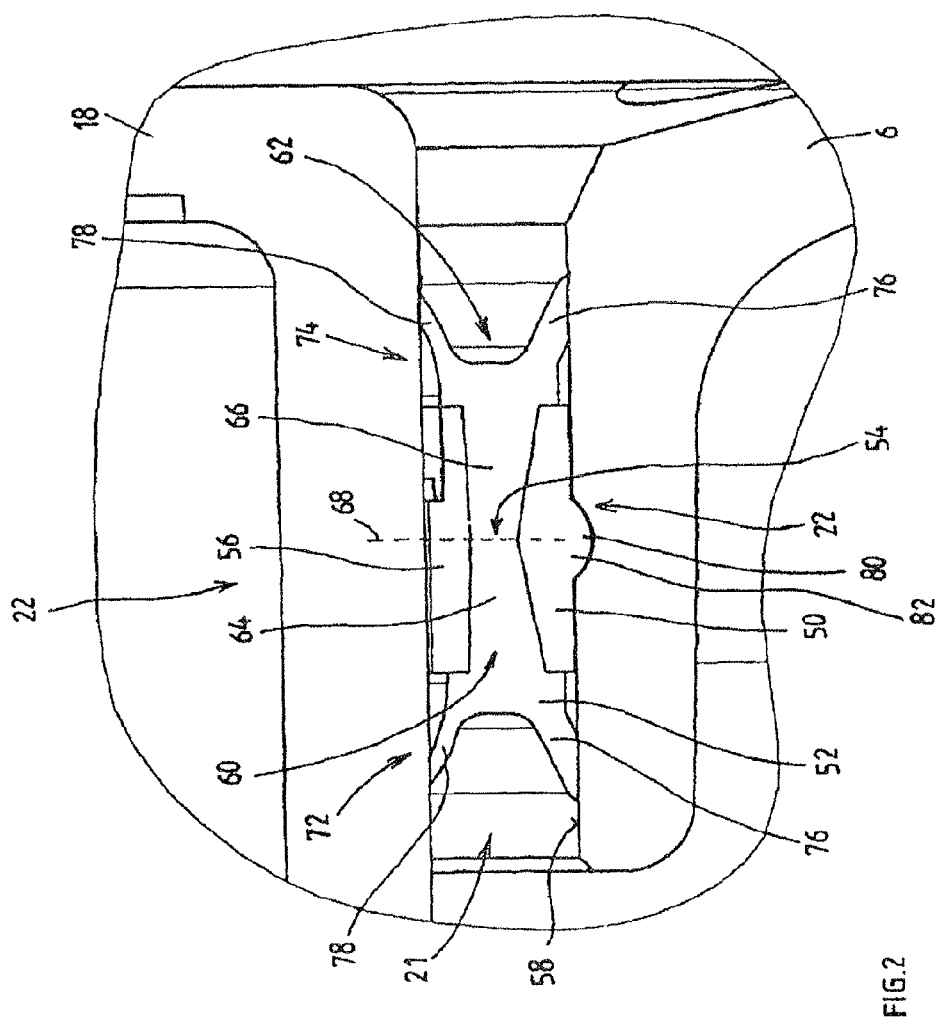
FIG. 2 is an enlarged view of a first sealing assembly from FIG. 1.

The sealing assembly 22 shown in FIG. 2 contains a guide ring 50 composed of a more rigid material than that of at least one sealing element 52. The spring brake piston rod 18 is guided along a cylindrical guiding portion 56 of the guide ring 50 which carries the at least one sealing element 52 that forms a seal against the spring brake piston rod 18 and a radially inner wall 58 of the central bore 21 of the partition 6. In the present case, the axial extent of the guiding portion 56 corresponds to that of the guide ring 50. In particular, the guide ring 50 is composed of a rigid plastic, such as acetal, and carries a sealing element 52 composed of an elastomer that is more flexible in comparison therewith. The spring brake piston rod 18, the spring brake piston 8 and the partition 6 are preferably composed of aluminum.

The sealing element 52 is connected to the guide ring 50 by a primary forming process such as injection molding or transfer molding, i.e. by direct shaping from a molding compound or from a liquid starting material by inserting the guide ring 50 as a finished component into a die, into which the elastomer material is then introduced under the action of pressure and heat (vulcanization), for example.

As a particularly preferred embodiment, the guide ring 50 has two annular end recesses 60, 62 that extend axially and are symmetrical with respect to a center plane 68 of the guide ring 50. The center plane is arranged perpendicularly to the axial direction or direction of movement of the spring brake piston rod 18, there being on the circumference a plurality of apertures 54 which connect the two recesses 60, 62 and through which the elastomer material passes or flows before cross-linking during the primary forming process. One aperture 54 of these apertures is shown in section by way of example in FIG. 2. The sealing element 52 is then held in the recesses 60, 62 by means of holding portions 64, 66, which are symmetrical with respect to the center plane 68 of the guide ring 50 and which are connected to one another via the aperture 54.

It is not only the holding portions 64, 66 but also the sealing element 52 and the entire sealing assembly 22 which are symmetrical with respect to the center plane 68 of the guide ring 50. Projecting axially from the end recesses 60, 62 of the guide ring 50 there are, in particular, sealing portions 72, 74, which each have a dovetail cross-section with two arms 76, 78 at each of their ends remote from the guide ring 50, one arm 76 in each case forming a seal against the radially inner wall 58 of the central bore 21 of the partition 6 and the other arm 78 forming a seal against the spring brake piston rod 18.

As a particularly preferred embodiment, the guide ring 50 is designed to be flexible in the radial direction such that at least one radially protruding projection 80 on the guide ring 50 can be latched with a recess 82 in the radially inner wall 58 of the central bore 21 of the partition 6. For assembly, the guide ring 50 is therefore introduced with the sealing element 52 already attached into the central bore 21 and, owing to its flexibility, it can be compressed by a certain amount radially until the projection 80 latches into the recess 82 in the radially inner wall 58 of the bore 21, and the guide ring 50 expands in a radially flexible manner in order to secure the latched joint.

Figure 3:
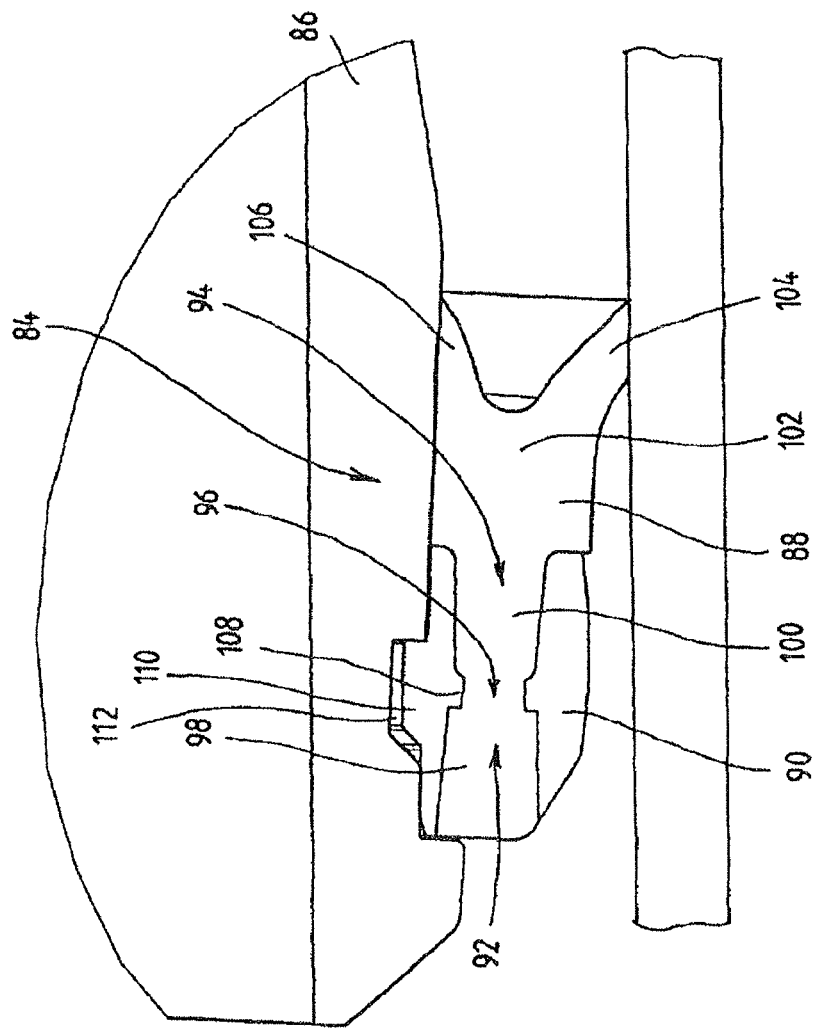
FIG. 3 is an enlarged view of another sealing assembly from FIG. 1.

The seal assembly 84 shown in FIG. 3 is arranged on the radially outer circumferential surface of a spring pot 86 of the spring brake piston 8, and is provided for the purpose of sealing off the spring chamber 14 containing the accumulator spring 10 from the spring brake chamber 12 of the spring brake cylinder 4, to which air can be admitted and from which air can be released. Consequently, this sealing assembly 84 is moved in a linear manner along the radially inner wall of the spring brake cylinder 4 together with the spring brake piston 8.

As in the case with the sealing assembly 22 described above, the sealing element 88 of sealing assembly 84 is connected to the guide ring 90 or formed to give an integral component by way of a primary forming process. Here too, as above, the guide ring 90 has two axial recesses 92, 94, which is penetrated, by way of a plurality of apertures 96 arranged in a manner distributed around its circumference, by holding portions 98, 100 of the sealing element 88 on each side of the apertures 96.

In contrast to the illustrative embodiment just described, however, just one sealing portion 102 projects axially from the guide ring 90, having at its end remote from the guide ring 90 a dovetail cross-section with two legs 104, 106. One leg 104 forms a seal against the radially inner wall of the spring brake cylinder 4 and the other leg 106 forms a seal against the radially outer circumferential surface of the spring pot 86 of the spring brake piston 8. A radially inner shoulder 108 in the region of the aperture 96 in the guide ring 90 provides an undercut cross-section and a positive connection between the sealing element 88 and the guide ring 90. Furthermore, the holding portions 98, 100 each have conical cross-sections, and this likewise produces a positive fit between the sealing element 88 and the guide ring 90.

As in the previous illustrative embodiment, at least one radially protruding projection 110 on the guide ring 90 can be latched with a recess 112 in the radially outer circumferential surface of the spring pot 86 of the spring brake piston 8.

Additionally, at least one cavity (not shown here) can be formed between the guide ring and the sealing element 52, 88 in order to hold lubricant that facilitates the sliding process between the sealing assemblies 22, 84 and the associated sliding partner.

Table of Reference Symbols

| | |
|---|---|
| 1 | service brake and spring accumulator |
| 2 | service brake cylinder |
| 4 | spring brake cylinder |
| 6 | partition |
| 8 | spring brake piston |
| 10 | accumulator spring |
| 12 | spring brake chamber |
| 14 | spring chamber |
| 16 | vent valve |
| 18 | spring brake piston rod |
| 20 | service brake chamber |
| 21 | bore |
| 22 | sealing assembly |
| 24 | diaphragm |
| 26 | diaphragm plate |

-continued

Table of Reference Symbols

| | |
|---|---|
| 28 | pushrod |
| 30 | return spring |
| 31 | spring chamber |
| 32 | fastening edge |
| 34 | holder |
| 36 | flange |
| 38 | flange |
| 40 | centering ring |
| 42 | radially inner circumferential surface |
| 44 | wall |
| 46 | cylinder axis |
| 48 | edge |
| 50 | guide ring |
| 52 | sealing element |
| 54 | aperture |
| 56 | guiding portion |
| 58 | wall |
| 60 | recess |
| 62 | recess |
| 64 | holding portion |
| 66 | holding portion |
| 68 | center plane |
| 72 | sealing portion |
| 74 | sealing portion |
| 76 | arm |
| 78 | arm |
| 80 | projection |
| 82 | recess |
| 84 | sealing assembly |
| 86 | spring pot |
| 88 | sealing element |
| 90 | guide ring |
| 92 | recess |
| 94 | recess |
| 96 | aperture |
| 98 | holding portion |
| 100 | holding portion |
| 102 | sealing portion |
| 104 | arm |
| 106 | arm |
| 108 | shoulder |
| 110 | projection |
| 112 | recess |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A combined service brake and spring brake cylinder for use in a vehicle brake system, comprising:
   a service brake piston, which is arranged in a housing of the service brake cylinder;
   a spring brake piston, which is arranged in a housing of the spring brake cylinder, is actuatable by at least one accumulator spring and has a spring brake piston rod that projects through a central bore of a partition between the service brake cylinder and the spring brake cylinder in order to act on the service brake piston;
   a sealing assembly located in the central bore of the partition and sealing off an interior of the service brake cylinder from an interior of the spring brake cylinder;
   an additional sealing assembly carried by a radial outer circumferential surface of the spring brake piston for sealing off a spring chamber that houses the accumulator spring from a spring brake chamber of the spring brake cylinder; wherein
   at least one of the sealing assemblies comprises a guide ring that is structurally configured to guide the spring brake piston rod in the central bore of the partition or the spring brake piston in the spring brake cylinder, said guide ring being composed of a more rigid material than that of at least one sealing element, the sealing element being: i) composed of an elastomer that is connected to the guide ring, and ii) being integrally formed with the guide ring,
   the guide ring includes at least one recess having an undercut cross-section, through which recess the sealing element projects so as to engage behind the undercut cross-section,
   the recess is arranged at an end of the guide ring and extends in an axial direction,
   the sealing element includes at least one holding portion for holding the sealing element in the recess of the guide ring, the sealing element further including at least one sealing portion projecting axially beyond the guide ring,
   the at least one holding portion of the sealing element connects to another holding portion via at least one axial aperture in the guide ring, and
   the guide ring is operatively configured to be flexible in a radial direction and includes at least one radially protruding projection latchable with a recess in a radially inner wall of the central bore of the partition or in a radially outer circumferential surface of the spring brake piston.

2. The combined service brake and spring brake cylinder according to claim 1, wherein the sealing element is integrally formed with the guide ring by one of injection molding and transfer molding.

3. The combined service brake and spring brake cylinder according to claim 1, wherein the guide ring is made of a plastic.

4. The combined service brake and spring brake cylinder according to claim 3, wherein the guide ring is made of acetal.

5. The combined service brake and spring brake cylinder according to claim 1, wherein the sealing portion of the sealing element includes a dovetail cross-section having two arms at an end remote from the guide ring, one arm forming a seal against a radially inner wall of the central bore of the partition or against the spring brake cylinder, and the other arm forming a seal against the spring brake piston rod or against the spring brake piston.

6. The combined service brake and spring brake cylinder according to claim 5, wherein the sealing element has a symmetrical configuration with respect to the guide ring and includes two sealing portions, each of which projects axially beyond the guide ring.

7. The combined service brake and spring brake cylinder according to claim 1, wherein the sealing element has a symmetrical configuration with respect to the guide ring and includes two sealing portions, each of which projects axially beyond the guide ring.

8. The combined service brake and spring brake cylinder according to claim 1, further comprising a cavity between the guide ring and the sealing element, the cavity being operatively configured to hold lubricant.

9. The combined service brake and spring brake cylinder according to claim 1, wherein the at least one of the sealing assemblies is symmetrical with respect to a center plane of the guide ring along an axial direction thereof, such that each end of the at least one of the sealing assemblies includes: i) an arm that contacts the spring brake piston rod, ii) an arm that contacts the partition, and iii) a recess interposed between each arm.

* * * * *